May 16, 1939.  E. B. ANDERSON  2,158,212
FLEXIBLE COUPLING
Filed March 1, 1937  2 Sheets-Sheet 1
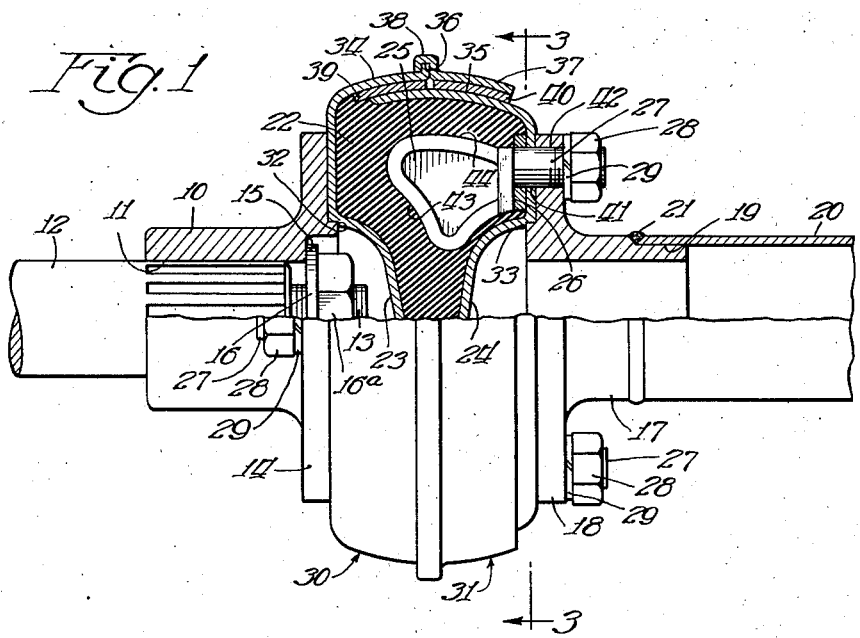
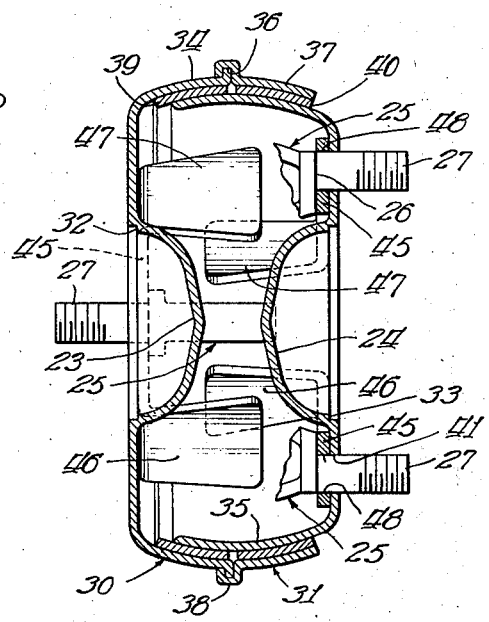
Inventor:
Edmund B. Anderson
By Edward C. Gritzbaugh
Atty.

May 16, 1939.  E. B. ANDERSON  2,158,212
FLEXIBLE COUPLING
Filed March 1, 1937  2 Sheets-Sheet 2
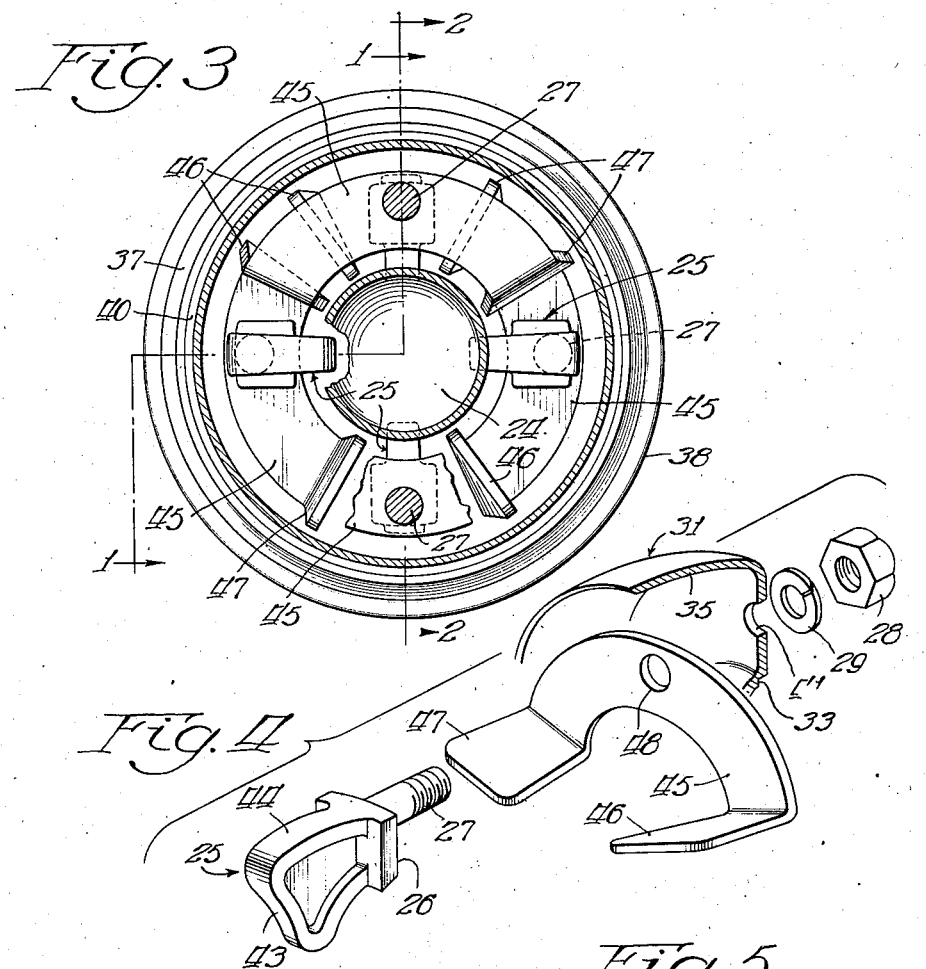
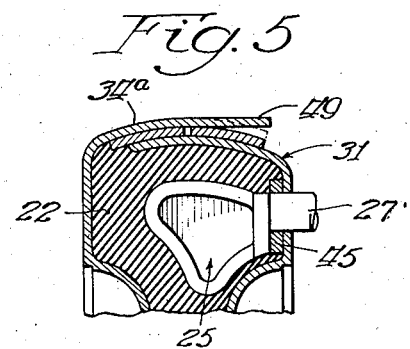
Inventor:
Edmund B. Anderson
By Edward C. Fitzhugh
Atty.

Patented May 16, 1939

2,158,212

UNITED STATES PATENT OFFICE 2,158,212

FLEXIBLE COUPLING

Edmund B. Anderson, Rockford, Ill., assignor to Borg-Warner Corporation, Chicago, Ill., a corporation of Illinois Application March 1, 1937, Serial No. 128,313

9 Claims. (Cl. 64—14)

This invention relates to flexible couplings in power transmission systems, and particularly to couplings which are required to transmit power between shafts, the axes of which are at an angle to one another.

It is an object of this invention to provide an improved flexible coupling which will transmit power efficiently between shafts in angular misalignment.

A feature of the invention is a casing for the resilient member of the coupling of such a contour as to prevent substantial axial expansion of the coupling under working conditions.

Another feature is an arrangement of driving elements within the resilient member which permits the resilient properties of the member to be used to best advantage.

Still another feature is a driving element construction which provides a simple means for securing the elements, casing and driving and driven shafts together.

Still another feature is a driving element in the form of a blade, the plane of which is such as to cause a component of force to be generated, which tends to contract the resilient member and increase the efficiency of the drive.

These and other objects and features of the coupling will become apparent from the following specification when taken in conjunction with the accompanying drawings which form a part thereof and wherein:

Fig. 1 is a side elevation partly in section of a coupling incorporating my invention;

Fig. 2 is a side elevation, taken along line 2—2 of Fig. 3, showing a portion of the coupling with the resilient element removed and the arrangement of the driving elements;

Fig. 3 is an elevation in section, taken along line 3—3 of Fig. 1, with the resilient element removed to show the driving elements assembled in the casing;

Fig. 4 is an exploded view in perspective of the driving element assembly; and

Fig. 5 is a fragmentary side elevation in section showing an alternative form of casing construction.

Similar parts are designated by the same reference characters in the various figures of the drawings and throughout the description hereinafter contained.

In its preferred form this invention comprises a pair of spaced flanged members, one of which is secured to a driving shaft and the other of which is secured to a driven shaft. Intermediate the flanged members is a resilient wheel-shaped element which is completely enclosed in a metal casing. Metal paddles are molded into the resilient element and are provided with studs which project through the casing and through suitable apertures in the flanged members for attachment thereto. The casing is made of two overlapping parts forming a type of ball joint which permits relative angular movement between the flanged members, but which precludes relative axial displacement of the shafts or displacement in a direction perpendicular to their axes.

Referring now to the drawings for a more detailed description of the invention, 10 is a hub having axial slots 11 in the interior thereof by which it is splined to a shaft 12. The end 13 of shaft 12 is made of reduced diameter and threaded to form a stud. One end of hub 10 is flanged as at 14 and is provided with a recess 15 to receive a washer 16 and a nut 16a by which hub 10 is held against axial movement on shaft 12. Spaced apart from hub 10 is a similar hub-shaped member 17 provided with a flange 18 and, in the form shown, with a portion 19 of reduced diameter over which is fitted a torque tube 20 welded thereto at 21.

Between flanges 14 and 18 is a resilient wheel 22 which performs the function of a carrier of a universal joint. It is preferably made from rubber, although other rubber-like substances may likewise be used. At the center of element 22 are cup-shaped depressions 23 and 24 which serve to provide clearance for nut 16 and also to effect an economy of material. The depressions may be symmetrical to simplify the manufacture of the wheel.

Embedded in wheel 22 are a number of blades 25, the greatest dimension of each being substantially normal to the direction of rotation of the wheel and of lesser magnitude than the axial dimension of the wheel. The number of blades used is determined largely by the size of each blade and the total load the coupling is to carry. In the form shown four blades, 90° apart, are used. Each blade 25 is provided with a shoulder 26 and an extension 27 which may be threaded to receive a nut 28. The blades are so positioned in wheel 22 that extensions 27 of alternate blades are pointed in opposite directions and shoulders 26 abut the sides of wheel 22.

Resilient wheel 22 is completely enclosed in a metal bi-partite housing 30, 31, which is conveniently fabricated from stampings. The stampings are provided with recesses 32 and 33 into which flanged hubs 10 and 17 are piloted. The outer portions 34 and 35 of stampings 30 and 31 are spherical to form a type of ball joint therebetween. In the form shown in Fig. 1, edge 36 of the outer stamping 30 is turned up or beaded. A ring 37, shaped as a continuation of the spherical surface of portion 34 is provided with an offset edge 38 which is rolled radially inward when the joint is assembled. Oilless bushings 39 and 40 are inserted between the stampings to reduce wear and friction.

Suitable apertures 41 are provided in stampings 30 and 31, and similar apertures 42 are provided in flanges 14 and 18 in substantial alignment with apertures 41 to permit extension 27 to be threaded therethrough. A lock washer 29 serves to prevent nut 28 from working loose.

Blades 25 are so shaped that when assembled with stampings 30 and 31, a sufficient amount of rubber is located between the forward and top edges 43 and 44, respectively, and the housing opposite thereto to avoid shearing the rubber at the edges.

One method of fabricating wheel 22 consists in placing blades 25 in a mold, molding rubber around them, and then vulcanizing the rubber to stampings 30 and 31. Other methods, however, will suggest themselves to those skilled in the art.

If the load requirements of the joint are such as to impose a prohibitive unit pressure upon the rubber, additional blades may be used. As shown in Fig. 4, the additional blades may take the form of sectors of annuli 45 with inturned ends which form blades 46, 47. The sectors, like the housing, may be formed of stampings. An aperture 48 is provided so that extension 27 of blade 25 may serve as a positioning and securing means for the sectors.

It has been found that the rubber, when compressed between adjacent blades, produces a force component which tends to separate the sides of the casing. This effect can be substantially eliminated by slightly inclining or pitching blades 46, 47 in the direction of the force so that a screw action is obtained which tends to advance the blades into the rubber. In the case of the driving member, the force referred to is, of course, the driving force of shaft 12, whereas in the case of the driven member the resistance to motion of the driven member constitutes the advancing force.

The construction of the outer stamping can be simplified as shown in Fig. 5. A spherical portion 34a may be provided with a cylindrical apron 49 which, after the two parts 30 and 31 of the bi-partite casing have been assembled, is rolled into a surface symmetrical with surface 34a. If the angularity between shafts is slight, a further simplification can be effected by eliminating bushings 39 and 40.

When in operation, the driving action is derived from the restoring force of the rubber between adjacent blades and between the blades and opposite side of the casing. If pitched blades are used, spreading of the casing is eliminated, and if under extreme circumstances such a tendency does occur, the spreading will be prevented by ring 34 or its equivalent, rolled apron 43.

The constructions shown are particularly economical to manufacture since the major parts are stampings and but one fastener is used to secure the blades, casing and flanged member together. In addition to its economy of manufacture, the coupling shown is mechanically centered through the bi-partite casing, which results in a well-balanced joint and in the elimination of a source of vibration.

It is understood that the foregoing description is merely illustrative of a preferred form of the invention, and that the invention, accordingly, is not to be limited thereto but is to be determined by the appended claims.

I claim:

1. A flexible coupling comprising apertured flanged members, a rubber wheel, an apertured metallic bi-partite casing to which said wheel is vulcanized, the apertures in the casing being substantially aligned with the apertures in the flanged members, a plurality of blades in said rubber wheel, extensions on the blades adapted to project through the apertures in the flanged members, said blades being threaded alternately through the apertures in each part of the bi-partite casing, and means for securing said extensions to their respective flanges.

2. A flexible coupling comprising a rubber wheel, a plurality of blades in said wheel, said paddles being of lesser length than the axial length of the wheel and positioned alternately along the sides of the wheel, a bi-partite casing for the wheel adapted to permit relative angular movement of the parts of the casing and to prevent relative axial movement therebetween, means for securing some of the blades to one part of the casing, means for securing the remainder of the blades to the other part of the casing, means for driving one part of the casing, and means on the other part of the casing for transmitting a driving force exteriorly of the casing.

3. In a flexible coupling a pair of spaced apertured members for securing the coupling to driving and driven shafts, a bi-partite apertured casing positioned between said members, the apertures of the spaced members and casing being in substantial alignment, a plurality of blades adjacent each part of the casing, rubber completely filling the casing and providing a resilient medium between the blades for the transmission of pressure therebetween, extensions on the blades threaded through corresponding apertures, and means for securing the extensions to the spaced members to establish a driving connection therebetween.

4. In a flexible coupling an apertured driving member, an apertured driven member, a plurality of blades, an extension on the blades, a casing surrounding the blades and having an aperture for each blade, a resilient medium substantially filling the casing, apertured annular strips having inturned ends to form blades the planes of which are at an angle to the axis of rotation of the coupling, said extensions being adapted to be threaded through corresponding apertures in the strips, casing and driving and driven members, and means for preventing the withdrawal of the extensions from said apertures.

5. A flexible coupling comprising driving and driven members, rubber intermediate the driving and driven members, a bi-partite casing surrounding the rubber, said casing having overlapping ends of spherical contour providing for angular movement while preventing axial displacement, lubricating means between the overlapping ends, and blades having transverse working surfaces and molded in the rubber in staggered relation to one another and having a substantially uniform thickness of rubber adjacent the working surfaces thereof, means for securing one portion of the blades to the driving member and means for securing another portion to the driven member.

6. In a flexible coupling spaced driving and driven members, a resilient wheel intermediate said members, a metal casing for the wheel effective to confine said resilient wheel and prevent axial displacement, a set of blades molded in said wheel, a second set of blades molded in said wheel, and extensions on said first set of blades for securing both sets of blades to the casing and to said members to establish a driving connection between said blades and members, said extensions passing through openings in the wall of said casing for connection with said driving and driven means.

7. In a flexible coupling having driving and driven parts, a housing, a plurality of blades within the housing and having working surfaces in planes normal to the axis of the coupling, a substantial thickness of resilient medium between the housing and said working surfaces, and means for driving part of the blades, said resilient medium serving to absorb oscillations resulting from misalignment of the driving and driven parts of the coupling.

8. In a flexible coupling, a metallic casing formed in a plurality of sections including a first section and a second section, said sections having overlapping arcuate wall portions defining a ball and socketlike relation to permit of limited relative angular movement but preventing axial displacement, a first group of torque reaction blades and a second group of torque reaction blades within said casing, a resilient reaction medium interposed between said groups of torque reaction blades, said groups of blades being provided with means for connecting the same respectively with the driving and driven shafts.

9. In a flexible coupling for connecting a driving shaft to a driven shaft, an intermediate flexible member comprising a generally wheel-shaped rubber block, a first set of torque reaction blades and a second set of torque reaction blades each imbedded in said rubber block and having axially protruding portions, means for connecting said protruding portions respectively with said driving and driven shafts, a metallic embracing casing for said rubber block effective to prevent axial displacement between said elements.

EDMUND B. ANDERSON.